United States Patent
Shono

(10) Patent No.: US 6,659,605 B2
(45) Date of Patent: Dec. 9, 2003

(54) CLIP-ON EYEWEAR

(75) Inventor: Tsuyoshi Shono, Kawasaki (JP)

(73) Assignee: Nikon Corporation & Nikon Eyewear Co., Ltd., Tokyo (JP)

( * ) Notice: Subject to any disclaimer, the term of this patent is extended or adjusted under 35 U.S.C. 154(b) by 31 days.

(21) Appl. No.: 09/892,908

(22) Filed: Jun. 28, 2001

(65) Prior Publication Data
US 2003/0002009 A1 Jan. 2, 2003

(51) Int. Cl.⁷ .................................. G02C 9/00
(52) U.S. Cl. ............................. 351/47; 351/48
(58) Field of Search ..................... 351/47, 57, 110, 351/48, 58

(56) References Cited

U.S. PATENT DOCUMENTS

| | | | | |
|---|---|---|---|---|
| 4,534,627 A | * | 8/1985 | Vosper | 351/47 |
| 5,585,870 A | | 12/1996 | Masunaga | 351/106 |
| 5,696,571 A | | 12/1997 | Spencer et al. | 351/47 |
| 5,708,490 A | * | 1/1998 | Wieczorek | 351/47 |
| 5,748,280 A | | 5/1998 | Herman | 351/110 |
| 5,867,244 A | * | 2/1999 | Martin | 351/47 |
| 5,936,700 A | * | 8/1999 | Masunaga | 351/47 |
| 6,070,978 A | | 6/2000 | Temming | 351/103 |

FOREIGN PATENT DOCUMENTS

JP    3032862    10/1996

* cited by examiner

Primary Examiner—Huy Mai

(57) ABSTRACT

Clip-on type sunglasses are constituted by a pair of sunglass lenses and a bridge member connecting these lenses. The two lenses respectively have a mounting clip member for mounting to the front endpiece or the rim end portion of spectacles; in order to mount on the bridge of spectacles, the mounting clip members are formed integrally with the bridge member. For mounting on spectacles of the rimless or wire frame type, light weight and neat external appearance are realized.

12 Claims, 3 Drawing Sheets

CLIP-ON EYEWEAR

BACKGROUND OF THE INVENTION

1. Field of the Invention

The present invention relates to clip-on type sunglasses, and in particular to clip-on type sunglasses having a bridge member which mounts on the bridge of spectacles. Such sunglasses are also known as overlenses.

2. Description of the Related Art

When going outdoors, and especially when experiencing glare when the weather is fine, sunglasses are generally worn. However, when a person wears spectacles for eyesight correction, removing the spectacles and putting on sunglasses is risky. A person who desires the function of both spectacles and sunglasses can eliminate or reduce the risk by mounting clip-on type sunglasses on the spectacles.

Various clip-on type sunglasses have heretofore been proposed. For example, please refer to U.S. Pat. No. 5,696,571 or Japanese Registered Utility Model No. 3,032,862. These sunglasses have mounting clip members for mounting to the lenses of spectacles. The mounting clip members are shown by reference numbers 50, 52 of FIG. 1 of the U.S. '571 patent and by reference number 2 in FIG. 1 of the Japanese '862 Utility Model.

Incidentally, the rimless type of spectacles, without a "rim which supports the (whole edge of the) lens" (U.S. Pat. Nos. 5,748,280, 5,585,870), or the wire frame (metal wire frame) type of spectacles which support only the upper edge of the lens with a wire rim (metal wire rim) (for example, U.S. Pat. No. 6,070,978), have become popular. In the wire frame type, the lower edge of the lens is fixed in the wire rim and is kept up by a filament or fine wire. Because the rim supporting the lens is absent or small in these spectacles, the external appearance is neat as viewed by another person. Furthermore, because of the absent or small rim, there is the advantage that the spectacles are lightweight.

In the case of mounting clip-on sunglasses on such rimless type or wire rim type spectacles, the mounting clip member is disadvantageous. This is because cases can occur in which they cannot be mounted, because the thickness of the spectacle lenses differs according to their owner. Even in cases in which mounting is possible, it can then be that the mounting member comes into contact with the spectacle lens. The reason for this is that there is no rim on the lower edge of the lens. Because of this, the mounting member of the prior art clip-on type sunglasses risked damaging the lens.

Moreover, the prior art clip-on type sunglasses are equipped with a rim which supports the sunglass lens. Because of this, the clip-on type sunglasses are heavy. A person who has selected light, rimless type or wire frame type spectacles dislikes heavy sunglasses.

SUMMARY OF THE INVENTION

The present invention has as its first object to provide clip-on type sunglasses whose mounting members do not risk damage to the lenses. A second object is to provide lightweight clip-on type sunglasses. A third object is to provide clip-on type sunglasses having a neat external appearance, with no rim.

The clip-on type sunglasses of the present invention comprise first and second sunglass lenses and a bridge member which connects these lenses; the said first and second sunglass lenses are equipped with first and second mounting clip members connected to the said bridge member at places on opposite sides. These members are in order to mount onto the front endpiece or rim end portion of the spectacles.

The said bridge member is furthermore equipped with a third mounting clip member in order to mount this bridge member to the bridge of the spectacles; the said bridge member and the said third mounting clip member are formed integrally.

The first and second mounting clip members are preferably hook-shaped; this hook shape is mounted, overlapping from above, on the said front endpiece or rim end portion, and preferably, the third mounting clip member has an upward-open groove, the bridge of the spectacles being inserted into this groove.

As another preferred feature, the first and second mounting clip members are hook-shaped; this hook shape is mounted, overlapping from below, on the front endpiece or rim end portion, and preferably, the third mounting clip member has a downward-open groove, and the bridge of the spectacles is inserted into this groove.

When the sunglasses are seen from the front, the said first mounting clip member, the said third mounting clip member, and the said second mounting clip member are preferably positioned on an upward-directed or downward-directed, gentle circular arc (on a line describing an arch).

In order for light weight, all the components of the clip-on type sunglasses of the present invention are preferably made of plastic.

The clip-on type sunglasses of the present invention are preferably mounted on rimless type or wire frame type spectacles.

DESCRIPTION OF THE PREFERRED EMBODIMENTS

A preferred mode of embodiment of the present invention will be described with reference to FIGS. 1–8. However, the scope of the invention is not to be considered as limited by this embodiment.

Figure 1:
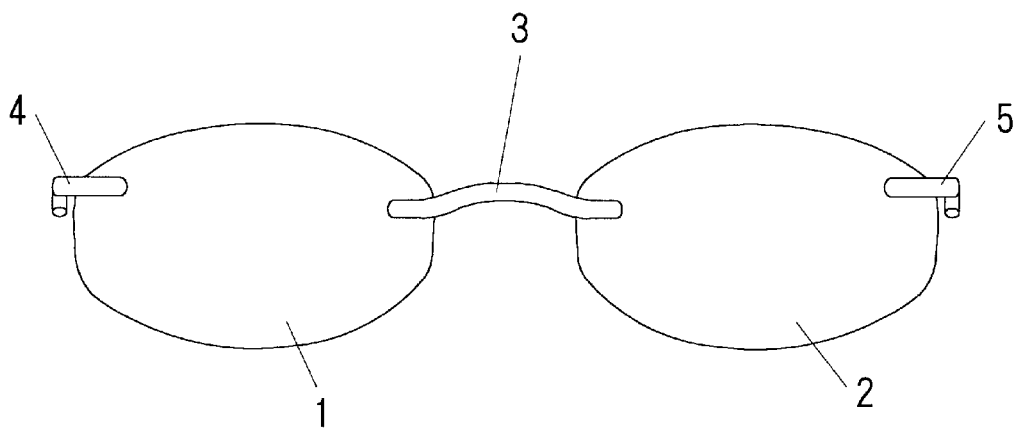
FIG. 1 is an elevation, seen from the front, of one example of the clip-on type sunglasses of the present invention.
Figure 3:
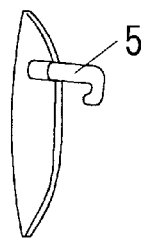
FIG. 3 is a side view of the sunglasses of FIG. 1.

These sunglasses, as shown in FIG. 1, comprise a first sunglass lens (1), a second sunglass lens (2), and a bridge member (3) connecting these lenses. The first and second sunglass lenses respectively have a first mounting clip member (4) and a second mounting clip member (5), respectively connected to the said bridge member (3) at places on opposite sides. As shown in FIG. 3, these mounting clip members (4, 5) are hook-shaped (about the shape of the character "7"). The mounting of the mounting clip members (4, 5) can be such that they overlap the front endpiece or rim end portion (10, 11) of the spectacles from above. The sunglasses can be mounted on the spectacles in this manner.

Figure 2:
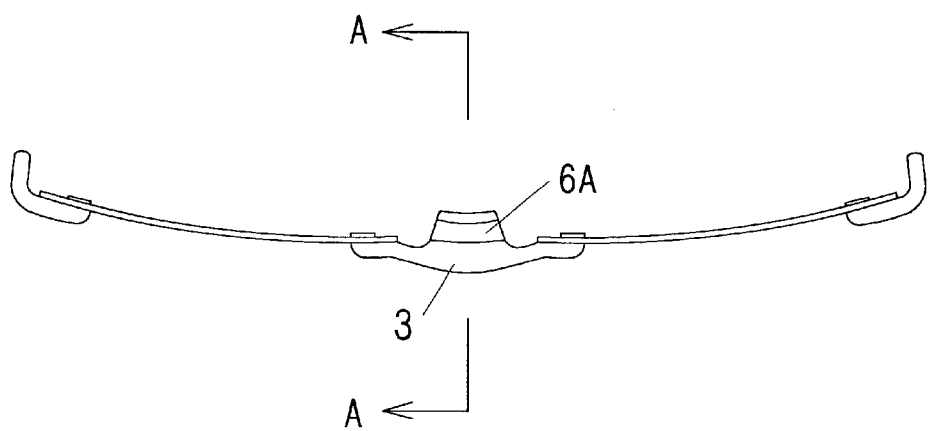
FIG. 2 is a top view of the sunglasses of FIG. 1.
Figure 7:
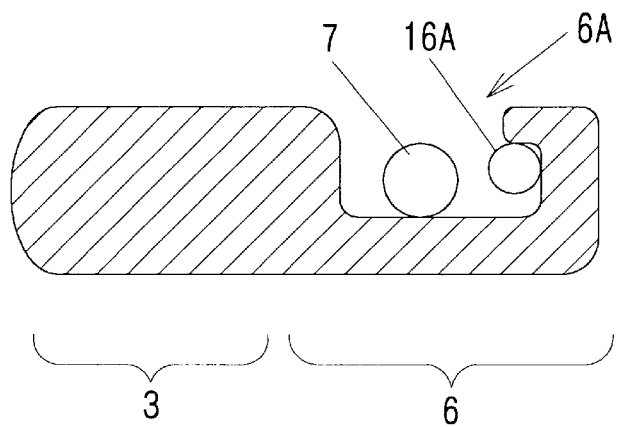
FIG. 7 is a cross sectional diagram of the bridge member drawn in FIG. 5.

The said bridge member (3), as shown in FIG. 7, has a third mounting clip member (6). The bridge member (3) and the mounting clip member (6) are integrally formed, comprising a single component. The third mounting clip member (6) mounts the bridge member (3) on the bridge (7) of the spectacles. Because the third mounting clip member (6) has, as shown in FIG. 2, a groove (6A) opened in the upward direction, the bridge (7) fills up this groove (6A).

The sunglasses are securely mounted to the spectacles by means of the three mounting clip members (4, 5, 6).

The mounting clip member (6) integrally formed with the bridge member (3), together with the two mounting clip members (4, 5), are preferably made of plastic. Here, in order to make them colorless and transparent, nylon or polyurethane was used.

However, if there is no great concern about color or transparency, other plastics may be used. For example, aliphatic polyamides, aromatic polyamides, ABS, AS resin, polyethylene (low density or high density), polystyrene, polypropylene, and the like polyolefins, polyvinyl chloride, polyvinylidene chloride, ethylene-(vinyl acetate) copolymer, polyvinyl alcohol, polyacetal, polycarbonate, polyethylene terephthalate, polybutylene terephthalate, and the like saturated polyesters, aromatic polyesters, polyether ketones, polyether ether ketones, polysulfones, polyether sulfones, polyetherimides, polyarylates, ionomers, liquid crystal polymers, polymethylpentene, polyimides, polyamide-imides, fluororesins, polyphenylene sulfides, (modified or unmodified) polyphenylene oxides, and the like thermoplastic resins, or, epoxy resins, unsaturated polyesters, polyimides and the like thermosetting resins, can be used.

The mounting clip members and bridge member can be colored to a preferred color. However, it is preferable to make those members colorless and transparent, so that they do not attract attention.

The method of mounting (fixing) the bridge member (3) and the two mounting clip members (4, 5) to the sunglasses (1, 2) can be carried out by various methods according to the prior art. Here, opening a small, oblong elliptical (or even rectangular) hole in the frame, those members are mounted or fixed to the lens by means of hot caulking or ultrasonic caulking. Those members may also be fixed to the lenses by means of adhesives instead of by hot caulking.

In the case that all the components are made of plastic, these sunglasses are lightweight (barely 1–4 g).

For example, the sunglasses (1, 2) are preferably made of acrylic resin, polycarbonate and the like thermoplastic resin, diethylene glycol diaryl dicarbonate (common name, CR-39) resin, and the like thermosetting resin. The reason is that these resins, in comparison with glass, are lightweight and safe, and the degree of freedom of shape is high. The degree of optical transmissivity can then be optionally reduced by means of coloration or dyeing of the resin.

In the case of dyeing, half dyeing or gradational dyeing may be adopted. However, the term "sunglasses" in the present invention is not limited to these, and the lenses may also be polarizing lenses or mirror lenses. Mirror lenses are those on which a mirror coating has been performed on the surface of the lenses. Here, polarizing lenses were used, made of polycarbonate 0.8 mm thick and dyed black to have a light ray transmissivity of 15%.

According to the case, the sunglass lenses (1, 2) may be normal lenses having dioptric power. A correction is not possible with one pair of spectacles for a person who has become presbyopic. Such a person, even when wearing one pair of spectacles, cannot see near or cannot see far objects. In this case it is necessary to substitute spectacles equipped with special correcting lenses. Because substitution is troublesome, in such a case, clip-on type spectacles equipped with lenses having dioptric power are put on (mounted) on the spectacles already being worn. The present invention also provides clip-on type spectacles equipped with such lenses having dioptric power. In this case, lenses having dioptric power are used in place of the sunglass lenses (1, 2) as described hereinabove. These lenses having dioptric power can of course have combined use as sunglass lenses.

Figure 4:
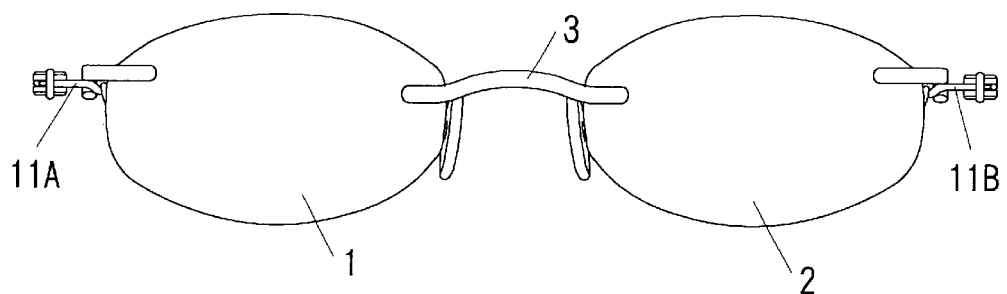
FIG. 4 is an elevation, seen from the front, of the sunglasses of FIG. 1, in the state mounted temporarily on wire frame type spectacles.
Figure 5:
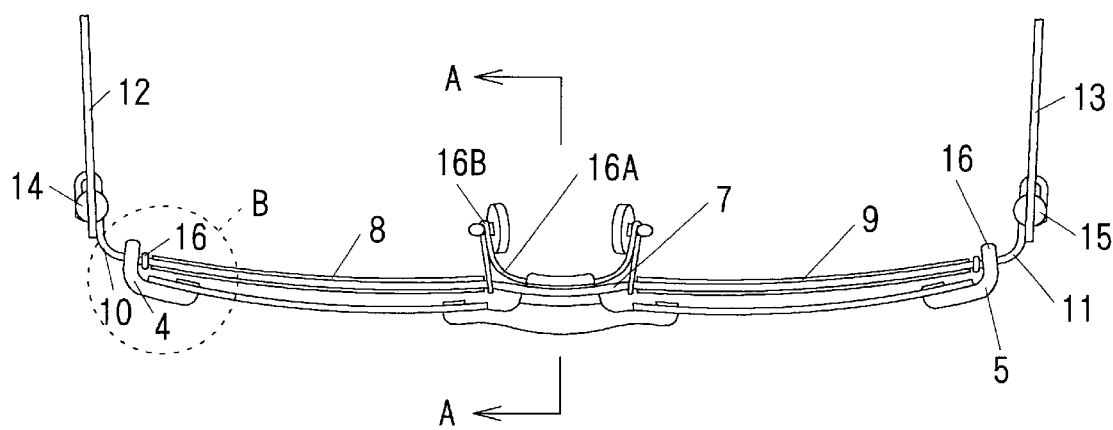
FIG. 5 is a top view of the sunglasses and spectacles of FIG. 4.
Figure 6:
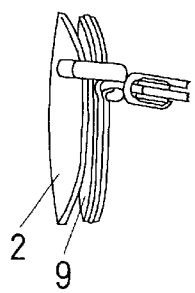
FIG. 6 is a side view of the sunglasses and spectacles of FIG. 4.
Figure 8:
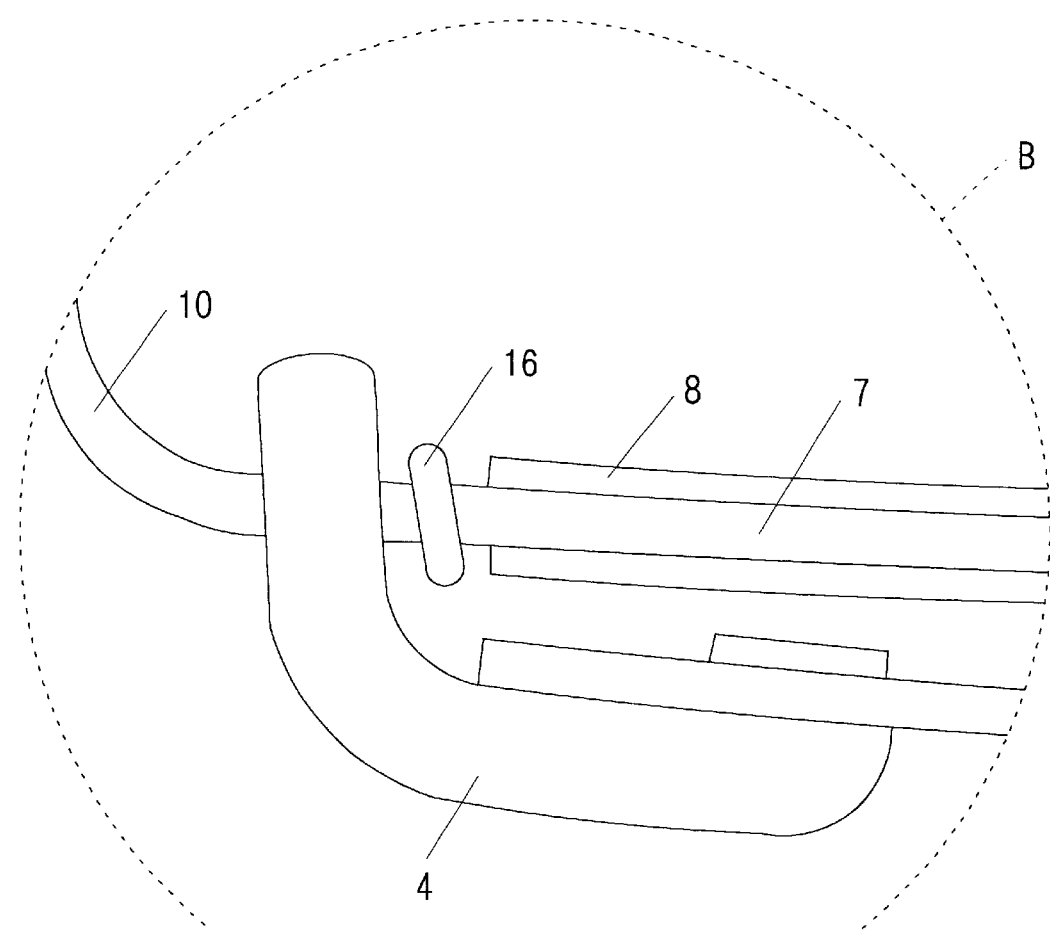
FIG. 8 is an enlarged diagram; the neighborhood indicated by B in FIG. 5 is enlarged.

The mounting of the sunglasses of FIG. 1 on spectacles is shown in FIGS. 4–6. These spectacles are of the wire frame type. The principal portion of the wire frame is a wire rim (7) made by bending a single wire of 1 mm diameter. The wire rim (7) is constituted by lens support portions (left, right pair) which support the upper edges of the spectacle lenses (8, 9), and a bridge portion which connects these. A groove of 1 mm width is disposed in the narrow edge surface of the lenses (8, 9) along the whole circumference. As shown in FIG. 8, the wire rim (7) is inserted into the grooves in the upper edges of these lenses (8, 9). Side end portions (10, 11) close to the temples (12, 13) of the wire frame (7) are free, and do not contact the lenses (8, 9).

According to the case, these end portions (10, 11) can be regarded as a front endpiece. These end portions (10, 11), after being bent through about 90°, continue to the hinges (14, 15). The temples (12, 13) connect to the wire frame (7) via the hinges (14, 15).

Two mounting clip members (4, 5) are mounted to respective free end portions (10, 11). Please refer to FIGS. 5 and 8. In a special case which is not shown here, the free end portions in the mounted state are elastically deformed in comparison with their state prior to mounting. In the case of elastic deformation, a stress which may return the free end portions to the original state is exerted on the mounting clip members (4, 5). Because of the stress, the mounting clip members (4, 5) and the end portions (10, 11) press against each other. Because of this, in a particular case, the sunglasses come off the spectacles only with difficulty.

The lower edges of the spectacle lenses (8, 9) are supported by a subsidiary wire (16) of diameter 0.7 mm. The ends of the subsidiary wire (16) on the temple sides are wound around and joined to the respective wire rims (7). A second bridge portion (16A) is constituted close to the center of the subsidiary wire (16). The second bridge portion (16A) is about parallel to the bridge portion of the wire rim (7). There is a curved portion (16B) at each end of the second bridge portion (16A) in order to mount a nose pad. The second bridge portion (16A) of the subsidiary wire (16) and the bridge portion of the wire rim (7) are both inserted into the groove (6A) of the bridge member (6) (see FIG. 7). In this state, the bridge portion of the wire rim (7) and the second bridge portion (16A) elastically deform in a direction to mutually narrow the gap. Because of this, stresses are exerted on the respective groove side surfaces at positions closer to the lenses of the two grooves (6A) (that is, toward the left and right ends, when the groove is seen from above). Because of this, it is hard for the bridge portion of the wire rim (7) and the second bridge portion (16A) to come out of the groove.

In addition to this, as shown in FIG. 7, the groove has a narrow width at the surface, and its width is wide in the middle. Because of this, the second bridge portion (16A) comes out of the groove (6A) only with difficulty, because of the overhang.

When the sunglasses are seen from the front, the first mounting clip member (4), the third mounting clip member (6), and the second mounting clip member (5) are arranged on a gentle, upward-directed circular arc (on a line describing an arch). This arrangement can also be modified to a special arrangement. The special arrangement is an arrangement in which, by means of the action of mounting the sunglasses, the wire rim (7) is bent comparatively slightly (elastic deformation) before mounting the sunglasses. When these members (4, 6, 5) mount the sunglasses comprising the special arrangement to the wire rim, the metallic wire rim (7) returns to its original shape, and these members (4, 6, 5) receive stress from the wire rim (7). Due to this stress, the wire rim (7) and these members (4, 6, 5) press against each other. In this manner, in the special arrangement, the restoring force of the wire rim is used to prevent the sunglasses from coming off the spectacles.

What is claimed is:

1. Clip-on sunglasses that attach to spectacles having two lenses connected by a spectacles bridge and rim end portions extending from either end of the lenses opposite the spectacles bridge, the clip-on sunglasses comprising:

a first sunglass lens and a second sunglass lens;

a sunglasses bridge connecting the first sunglass lens and the second sunglass lens;

a first mounting clip and a second mounting clip respectively attached to each end of the first sunglass lens and the second sunglass lens opposite the sunglasses bridge, the first mounting clip and the second mounting clip respectively attaching to each rim end portion of the spectacles; and a third mounting clip integrally formed with the sunglasses bridge to attach the sunglasses bridge to the spectacles bridge, wherein the first mounting clip and the second mounting clip are hook-shaped with the first mounting clip and the second mounting clip respectively hooking over each rim end portion of the spectacles, and the third mounting clip has a groove opened upward with the spectacles bridge being inserted into the groove.

2. The clip-on sunglasses according to claim 1, wherein the clip-on sunglasses are made of plastic.

3. The clip-on sunglasses according to claim 1, wherein the first sunglass lens and the second sunglass lens are one of polarizing lenses, mirror lenses, dyed lenses, and colored lenses.

4. The clip-on sunglasses according to claim 1, wherein the first sunglass lens and the second sunglass lens have dioptric power.

5. The clip-on sunglasses according to claim 1, wherein the clip-on sunglasses attach to rimless or wire frame spectacles.

6. The clip-on sunglasses according to claim 1, wherein the clip-on sunglasses have a weight of about 1 to 4 g.

7. Clip-on sunglasses that attach to spectacles having two lenses connected by a spectacles bridge and rim end portions extending from either end of the lenses opposite the spectacles bridge, the clip-on sunglasses comprising:

a first sunglass lens and a second sunglass lens;

a sunglasses bridge connecting the first sunglass lens and the second sunglass lens;

a first mounting clip and a second mounting clip respectively attached to each end of the first sunglass lens and the second sunglass lens opposite the sunglasses bridge, the first mounting clip and the second mounting clip respectively attaching to each rim end portion of the spectacles; and a third mounting clip integrally formed with the sunglasses bridge to attach the sunglasses bridge to the spectacles bridge, wherein the first mounting clip and the second mounting clip are hook-shaped with the first mounting clip and the second mounting clip respectively hooking over each rim end portion of the spectacles, and the third mounting clip has a groove opened upward with the spectacles bridge being inserted into the groove.

8. The clip-on sunglasses according to claim 7, wherein the clip-on sunglasses are made of plastic.

9. The clip-on sunglasses according to claim 7, wherein the first sunglass lens and the second sunglass lens are one of polarizing lenses, mirror lenses, dyed lenses, and colored lenses.

10. The clip-on sunglasses according to claim 7, wherein the first sunglass lens and the second sunglass lens have dioptric power.

11. The clip-on sunglasses according to claim 7, wherein the clip-on sunglasses attach to rimless or wire frame spectacles.

12. The clip-on sunglasses according to claim 7, wherein the clip-on sunglasses have a weight of about 1 to 4 g.

* * * * *

UNITED STATES PATENT AND TRADEMARK OFFICE
CERTIFICATE OF CORRECTION

PATENT NO.    : 6,659,605 B2
DATED         : December 9, 2003
INVENTOR(S)   : Tsuyoshi Shono It is certified that error appears in the above-identified patent and that said Letters Patent is hereby corrected as shown below:

Column 6,
Line 29, change "over" to -- under --;
Line 31, change "upward" to -- downward --.

Signed and Sealed this

Fourth Day of May, 2004

JON W. DUDAS
*Acting Director of the United States Patent and Trademark Office*